(12) United States Patent
Chauvel

(10) Patent No.: US 8,185,666 B2
(45) Date of Patent: May 22, 2012

(54) COMPARE INSTRUCTION

(75) Inventor: Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 1523 days.

(21) Appl. No.: 11/116,522

(22) Filed: Apr. 28, 2005

(65) Prior Publication Data

US 2006/0026395 A1 Feb. 2, 2006

(51) Int. Cl.
*G06F 12/00* (2006.01)
(52) U.S. Cl. ............................................. 710/1; 712/208
(58) Field of Classification Search .................... 712/34, 712/245, 227, 225, 223; 711/1, 128, 144, 711/170
See application file for complete search history.

(56) References Cited

U.S. PATENT DOCUMENTS 6,014,723 A * 1/2000 Tremblay et al. .................. 711/1
6,408,383 B1 * 6/2002 Tremblay et al. ............. 712/227

OTHER PUBLICATIONS

Vahid et al., Embedded System Design, 2002, Wiley, pp. 148-153.*
Mano, Digital Logic and Computer Design, 1979, Prentice Hall, pp. 382-384.*

* cited by examiner

*Primary Examiner* — Cheng-Yuan Tseng
(74) *Attorney, Agent, or Firm* — Ronald O. Neerings; Wade James Brady, III; Frederick J. Telecky, Jr.

(57) ABSTRACT

A processor executes an instruction that causes a comparison to be performed between contents of a first register and contents of a second register and between the contents of the first register and a predetermined value. The instruction is particularly useful for determining whether an attempted access (either a load or write) to an array improperly targets a location outside the boundary of the array. In some embodiments, a system (e.g., a communication device such as cellular telephone) includes a processor capable of executing the instruction as described above.

20 Claims, 2 Drawing Sheets

*FIG. 1*
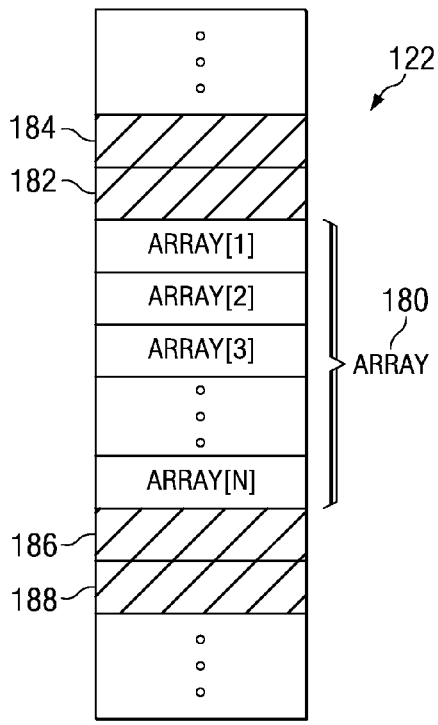
*FIG. 2*
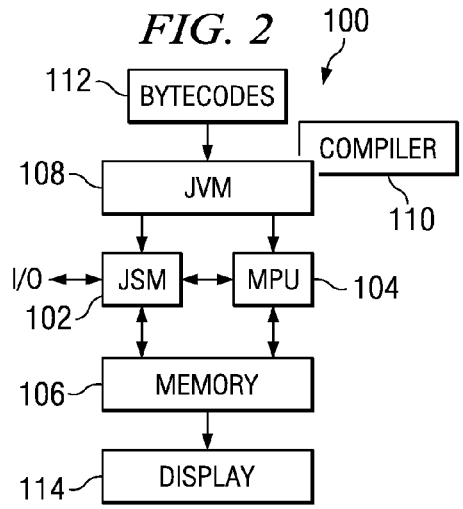
*FIG. 3*
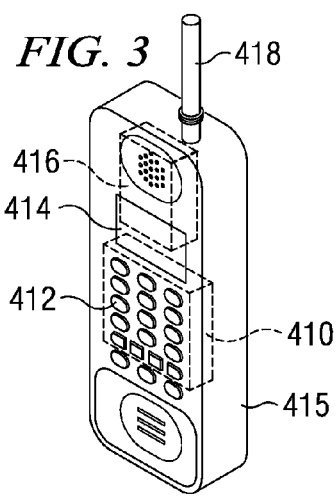
*FIG. 5*
| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | GENERAL PURPOSE (GP) |
| R5 | GENERAL PURPOSE / LOCAL VARIABLE POINTER (LV) |
| R6 | STACK POINTER (SP) |
| R7 | TOP OF STACK (ToS) |
| R8 | GENERAL PURPOSE (GP) |
| R9 | GENERAL PURPOSE (GP) |
| R10 | GENERAL PURPOSE (GP) |
| R11 | GENERAL PURPOSE (GP) |
| R12 | GENERAL PURPOSE (GP) |
| R13 | GENERAL PURPOSE (GP) |
| R14 | GENERAL PURPOSE (GP) |
| R15 | STATUS AND CONTROL (ST) |

COMPARE INSTRUCTION

CROSS REFERENCE TO RELATED CASES

This application claims the benefit of European Patent Application No. 04291918.3, filed Jul. 27, 2004, incorporated by reference herein as if reproduced in full below.

BACKGROUND

1. Technical Field

The present subject matter relates generally to processors and more particularly to an instruction that executed on a processor and that determines whether an array access (e.g., an array load or an array store) improperly targets a location outside the array.

2. Background Information

The execution of some types of programming languages, such as Java™, preclude accessing an array with an index value that points to an element that lies outside the boundary of the array. An access may comprise an array store or an array load operation. An array store instruction attempts to store a value at a certain location within a target array. The location within the array is defined by an index value included as part of the store or load instruction. An array load attempts to retrieve a value from a certain location (specified by an index) within the array.

If the index value corresponds to a location outside the boundaries of the array, an error results and an exception is "thrown" meaning that program flow is interrupted and control jumps to an exception handler to address this anomalous behavior. Multiple checks for boundary violations must be performed. Such checks slow down the performance of the executing code.

BRIEF SUMMARY

In at least one embodiment, a processor executes an instruction that causes a comparison to be performed between contents of a first register and contents of a second register and between the contents of the first register and a predetermined value. In another embodiment, a system comprises a co-processor coupled to a main processor unit. The co-processor executes an instruction that causes a determination to be made as to whether an array index value points to a location preceding or following an array. In yet another embodiment, a method comprises examining the instruction to determine a first register and a second register, the first register containing an array index value and the second register containing an array size value. The method also comprises comparing the array index value to the array size value, comparing the array index value to a predetermine value, and setting a common status bit if a condition is true selected from a group consisting of the array index value being greater than or equal to the array size value and the array index value being less than a predetermined value.

The embodiments described herein are particularly useful for determining whether an attempted access (either a load or write) to an array improperly targets a location outside the boundary of the array.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 1 illustrates the boundaries of an array;

FIG. 2 shows a diagram of a system in accordance with preferred embodiments of the invention and including a Java Stack Machine ("JSM") and a Main Processor Unit ("MPU");

FIG. 3 illustrates an embodiment of the invention in the form of a wireless communication device such as a cellular telephone;

FIG. 5 shows various registers used in the JSM;

DETAILED DESCRIPTION OF THE PREFERRED EMBODIMENTS

Figure 4:
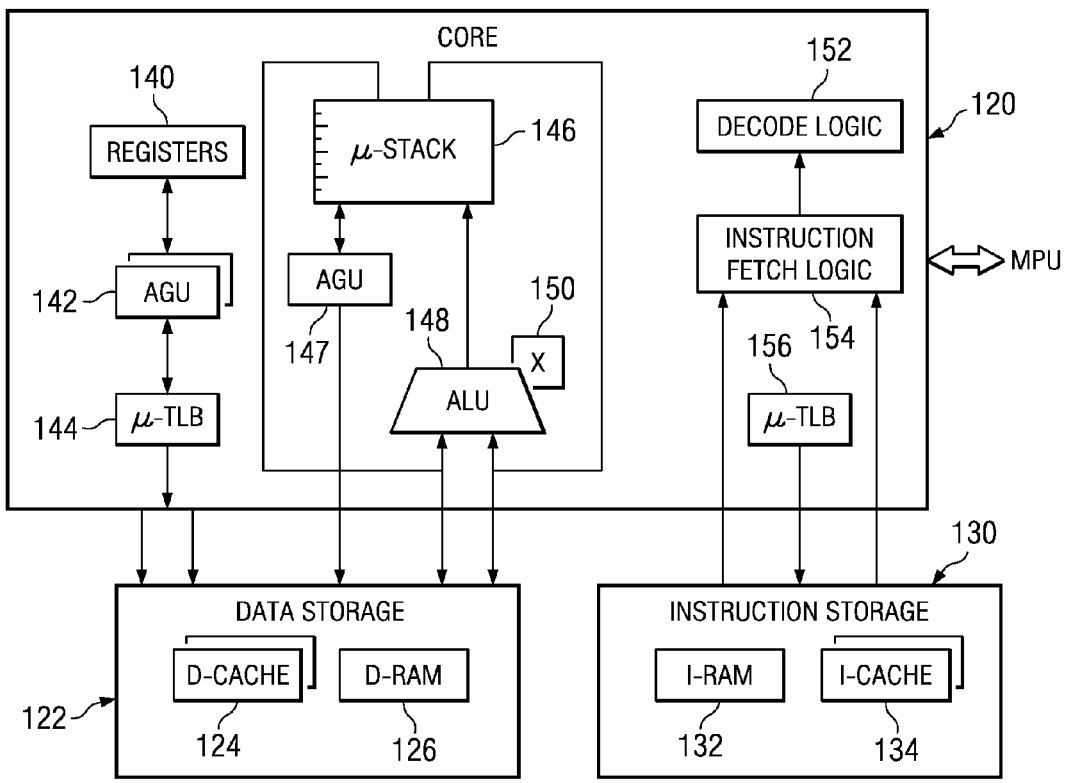
FIG. 4 shows a block diagram of the JSM of FIG. 2 in accordance with preferred embodiments of the invention.

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor that executes various instructions including, without limitation, a "CMPAL" instruction. As will be explained in detail below, the CMPAL instruction incorporates two or more comparisons in one instruction. The comparisons check to determine whether an index for an array load or an array store instruction into an array is pointing to a location "above" or "below" the array in memory. FIG. 1 illustrates this situation.

In this disclosure it is assumed that a store instruction that stores data to an array (an "array store") or a load instruction that loads data from an array (an "array load") include, perhaps among other information, an index value and an array size value. The index value identifies a target element within the array for the load or store and the size value identifies the size of the array. It is also assumed that, when an array load or store instruction executes, the index value and the size value from the instruction are stored in separate registers within the processor where the instruction executes.

Referring to FIG. 1, an array 180 is shown in memory (e.g., memory 122). The array 180 comprises n elements designated as ARRAY[1], ARRAY[2], ARRAY[3], . . . , ARRAY [n]. The size of the array is thus n. The numbers in the brackets are the index values. Memory elements 182, 184, 186, and 188 are not part of array 180 and thus lie outside the boundaries of the array. The index value of an array store or load instruction that targets array 180 points to one of the elements in array 180. The index value should not point to a position above the array (e.g., elements 182 or 184) or below the array (e.g., elements 186 or 188). The CMPAL instruction checks for both of these boundary violation conditions and reports a violation by way of one or more status bits. The state of this status bit can then be checked and, if set (indicative of a boundary violation), control can branch to an exception handler. The CMPAL instruction preferably is executed prior to the execution of an array load or store to prevent the faulty load or store from actually occurring.

The following describes the operation of a preferred embodiment of a processor on which the CMPAL instruction may run. Other processor architectures and embodiments may be available or developed on which to run the instruction and thus this disclosure and the claims which follow are not limited to any particular type of processor. Details regarding the operation and format of the CMPAL instruction follow the description of the processor.

The processor described herein is particularly suited for executing Java™ Bytecodes or comparable code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims which follow. The processor described herein may be used in a wide variety of electronic systems. By way of example and without limitation, the Java-executing processor described herein may be used in a portable, battery-operated communication device such as a cellular telephone, personal data assistants ("PDAs"), etc. Further, the processor advantageously includes one or more features that permit the execution of the Java code to be accelerated.

Referring now to FIG. 2, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 and/or MPU 104 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may include, without limitation, a battery and an analog transceiver to permit wireless communications with other devices. As noted above, while system 100 may be representative of, or adapted to, a wide variety of electronic systems, an exemplary electronic system may comprise a battery-operated, mobile cell phone such as that is shown in FIG. 3.

As shown in FIG. 3, a mobile communications device includes an integrated keypad 412 and display 414. Two processors and other components may be included in electronics package 410 connected to keypad 412, display 414, and radio communication transceiver (e.g., radio frequency ("RF") circuitry) 416 which may be connected to an antenna 418.

As is generally well known, Java code comprises a plurality of "bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java bytecodes. When appropriate, however, the JSM 102 may request the MPU 104 to execute one or more Java bytecodes not executed or executable by the JSM 102. In addition to executing Java bytecodes, the MPU 104 also may execute non-Java instructions. The MPU 104 also hosts an operating system ("O/S") (not specifically shown), which performs various functions including system memory management, system task management for scheduling the JVM 108 and most, or all, other native tasks running on the system, management of the display 114, receiving input from input devices, etc. Without limitation, Java code may be used to perform any one of a variety of applications including multimedia data processing, games or web-based applications, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

In accordance with preferred embodiments of the invention, the JSM 102 may execute at least two instruction sets. One instruction set may comprise standard Java bytecodes. As is well-known, Java is a stack-based programming language in which instructions generally target a stack. For example, an integer add ("IADD") Java instruction pops two integers off the top of the stack, adds them together, and pushes the sum back on the stack. The JSM 102 comprises a stack-based architecture with various features that accelerate the execution of stack-based Java code, such as those described in U.S. Pat. Pub. Nos. 2004/0078550, 2004/0078557, and 2004/0024999, all of which are incorporated herein by reference.

Another instruction set executed by the JSM 102 may include instructions other than standard Java instructions. In accordance with at least some embodiments of the invention, such other instruction set may include register-based and memory-based operations. This other instruction set generally complements the Java instruction set and, accordingly, may be referred to as a complementary instruction set architecture ("CISA"). By complementary, it is meant that the execution of one or more Java bytecodes may be substituted by "microsequences" using CISA instructions that enable faster, more efficient operation. The two sets of instructions may be used in a complementary fashion to obtain satisfactory code density and efficiency. As such, the JSM 102 generally comprises a stack-based architecture for efficient and accelerated execution of Java bytecodes combined with a register-based architecture for executing register and memory based CISA instructions. Both architectures preferably are tightly combined and integrated through the CISA.

FIG. 4 shows an exemplary block diagram of the JSM 102. As shown, the JSM includes a core 120 coupled to data storage 122 and instruction storage 130. The core may include one or more components as shown. Such components preferably include a plurality of registers 140, address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146 and processed by the ALU 148, while instructions may be fetched from instruction storage 130 by fetch logic 154 and decoded by decode logic 152. The address generation unit 142 may be used to calculate addresses based, at least in part, on data contained in the registers 140. The AGUs 142 may calculate addresses for CISA instructions. The AGUs 142 may support parallel data accesses for CISA instructions that perform array or other types of processing. AGU 147 couples to the micro-stack 146 and manages overflow and underflow conditions in the micro-stack, preferably in parallel. The micro-TLBs 144, 156 generally perform the function of a cache for the address translation and memory protection information bits that are preferably under the control of the operating system running on the MPU 104.

Referring now to FIG. 5, the registers 140 may include 16 registers designated as R0-R15. All registers are 32-bit registers in accordance with the preferred embodiment of the invention. Registers R0-R5 and R8-R14 may be used as general purpose ("GP") registers, thereby usable for any purpose by the programmer. Two of these registers, for example, are used during the execution of the CMPAL instruction as will be explained below. Other registers, and at least one of the GP purpose registers, may be used for specific functions. For example, in addition to use as a GP register, register R5 may be used to store the base address of a portion of memory in which Java local variables may be stored when used by the current Java method. The top of the micro-stack 146 is reflected in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Register R15 is used for status and control of the JSM 102. The CMPAL instruction, again as will be explained below, sets one or more of the bits of register R15 to signal the occurrence of an array boundary violation (an array store or load that targets a location in memory other than the valid locations of an array).

Referring again to FIG. 4, as noted above, the JSM 102 is adapted to process and execute instructions from at least two instruction sets. One instruction set includes stack-based operations and the second instruction set includes register-based and memory-based operations. The stack-based instruction set may include Java bytecodes. Java bytecodes pop, unless empty, data from and push data onto the micro-stack 146. The micro-stack 146 preferably comprises the top n entries of a larger stack that is implemented in data storage 122. Although the value of n may vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The second, register-based, memory-based instruction set may comprise the CISA instruction set introduced above. The CISA instruction set preferably is complementary to the Java bytecode instruction set in that the CISA instructions may be used to accelerate or otherwise enhance the execution of Java bytecodes. For example, the compiler 110 may scan a series of Java bytes codes 112 and replace one or more of such bytecodes with an optimized code segment mixing CISA and bytecodes and which is capable of more efficiently performing the function(s) performed by the initial group of Java bytecodes. In at least this way, Java execution may be accelerated by the JSM 102. The CISA instruction set includes a plurality of instructions including an "CMPAL" instruction as mentioned above and explained below in detail.

Referring still to FIG. 4, the ALU 148 adds, subtracts, and shifts data. The multiplier 150 may be used to multiply two values together in one or more cycles. The instruction fetch logic 154 generally fetches instructions from instruction storage 130. The instructions are decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a CISA mode in which CISA instructions may be decoded.

The data storage 122 generally comprises data cache ("D-cache") 124 and data random access memory ("D-RAMset") 126. Reference may be made to U.S. patent Publications Ser. No. 09/591,537 filed Jun. 9, 2000, Ser. No. 09/591,656 filed Jun. 9, 2000, Ser. No. 09/932,794 filed Aug. 17, 2001, and U.S. Pat. Pub. No. 20040260904, all of which are incorporated herein by reference, for information related to the D-RAMset. The stack (excluding the micro-stack 146), arrays and non-critical data may be stored in the D-cache 124, while Java local variables, critical data and non-Java variables (e.g., C, C++) may be stored in D-RAMset 126. The instruction storage 130 may comprise instruction RAM ("I-RAM") 132 and instruction cache ("I-cache") 134.

Figure 6:
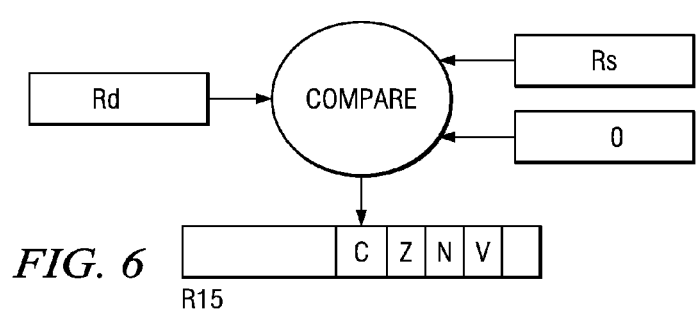
FIG. 6 shows a function performed by a CMPAL instruction in accordance with the preferred embodiment of the invention.

One of the CISA instructions, as noted above, is the "CMPAL" instruction. The function performed by the CMPAL instruction is to detect the occurrence of an imminent array boundary violation as is illustrated in FIG. 6. As shown, the CMPAL instruction performs several comparisons. First, the CMPAL instruction compares the contents of a first register (Rd) to the contents of a second register (Rs). Second, the CMPAL instruction compares the contents of register Rd to a predetermined value (e.g., 0). The results of the comparisons are indicated in the status register R15 (FIG. 5). Register Rd preferably contains the index value to an element of an array in, for example, an array load or store instruction. As noted above, the index value should not point to a location outside the boundary of the array. That is, the index value should not be greater than the size (n) of the array. In the embodiments described herein, the index value is a 0-based number and thus ranges from 0 to n−1. An index value of 0 refers to the first location of the array (ARRAY[1]). Register Rs contains the value n (the size of the array). The index and size values are loaded into registers Rd and Rs by previous instructions from stack and memory.

Because Rd contains the array index value and Rs contains the array size value n, the CMPAL instruction, in the first comparison noted above, compares the index value to the array size. More specifically, the CMPAL instruction determines whether the index is greater than or equal to the size value. If the index value is, in fact, greater than or equal to the size value, then the index value points to a location beyond the range of the array (e.g., elements 186,188 in FIG. 1). In this case, the CMPAL instruction causes a bit in the status register to be set to indicate an out of bound condition with regard to an array load or store instruction. In FIG. 6, the particular bit that is set in the status register R15 is the "C" bit.

The other out of bounds condition that is checked by the CMPAL instruction is whether the index value points to a location preceding the array (e.g., elements 182 and 184 in FIG. 1). As the index is a 0-based value, this is accomplished by determining whether the index is less than 0. Accordingly, the CMPAL instruction, as depicted in FIG. 6, also causes the index value in register Rd to be compared to the predetermined value 0. If the result of that comparison is that the index value is indeed less than 0, then the CMPAL instruction sets the C bit in the status register. The C bit becomes set based on either or both of the preceding comparisons.

The CMPAL instruction may perform other comparisons in addition to those described above. The status register R15 in FIG. 6 also shows various other status bits, such as the Z, N, and V bits. These can be set as well by other comparisons that the CMPAL instruction may perform. The Z bit is set when the index value in register Rd equals the size value in register Rs. The N bit is set when the index value in register Rd is less than the size value in register Rs. Finally, the V bit is set when an overflow would occur if the contents of Rs were subtracted from the contents of Rd.

Figure 7:
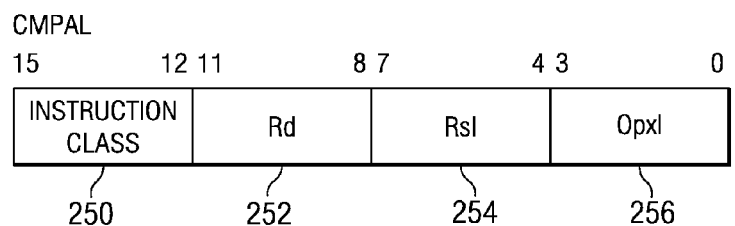
FIG. 7 shows an exemplary format of the CMPAL instruction in accordance with a preferred embodiment of the invention.

FIG. 7 shows an exemplary format for the CMPAL instruction. As shown in FIG. 7, the CMPAL instruction is a 16-bit instruction, although the number of bits for the instruction can be varied as desired. The instruction comprises a plurality of fields 250-256. Fields 252 and 254 comprise the identities of the Rd and Rs registers. These registers can be any of the general purpose registers listed in FIG. 5 that are used for storing the index and array size values as described above.

Field 250 comprises an instruction class value that identifies the class to which the instruction pertains. Some classes may have only a single instruction pertaining thereto and thus the instruction class field 250 identifies the particular instruction (similar to an opcode). The CMPAL instruction pertains to an instruction class that includes multiple instructions including CMPAL and other instructions. In this situation, the particular instruction is identified by the OpX1 value in field 256. Thus, the OpX1 value in FIG. 7 is a value that uniquely identifies the instruction as a CMPAL instruction.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A processor executing a plurality of instructions, comprising:
    an arithmetic logic unit (ALU); and
    a plurality of registers coupled to the ALU;
    wherein said processor executes an instruction that causes a first comparison to be performed between contents of a first register and contents of a second register and a second comparison to be performed between the contents of the first register and a predetermined value; and
    wherein the instruction causes a first status bit to be set if either of said comparisons results in a true condition and a second status bit to be set if the first comparison determines that the contents of the first register equal the contents of the second register.

2. The processor of claim 1 wherein the predetermined value is 0.

3. The processor of claim 1 wherein the instruction determines whether the contents of the first register is less than the predetermined value.

4. The processor of claim 1 wherein the instruction determines whether the contents of the first register is greater than or equal to the contents of the second register.

5. The processor of claim 1 wherein the contents of the first register comprises an index value associated with an array and the contents of the second register comprises a value indicative of the size of the array.

6. The processor of claim 1 wherein the instruction causes an overflow status bit to be set if an overflow would occur upon subtracting the contents of the second register from the contents of the first register.

7. The processor of claim 1 wherein the instruction causes additional comparisons to be performed.

8. The processor of claim 1 wherein the instruction identifies the first and second registers.

9. A processor, comprising:
    an arithmetic logic unit (ALU); and
    a plurality of registers coupled to the ALU;
    wherein said processor executes a comparison instruction that causes a determination to be made as to whether an array index value points to a location preceding or following an array so as to check whether an array boundary violation would occur for a subsequent array access instruction; and
    wherein the comparison instruction also causes a first status bit to be set if the array index value points to a location preceding or following the array and a second status bit to be set if the array index value equals the size of the array.

10. The processor of claim 9 wherein the comparison instruction causes a comparison to be performed between contents of a first register and contents of a second register and between the contents of the first register and a predetermined value, wherein the contents of the first register comprises an index value associated with the array and the contents of the second register comprises a value indicative of the size of the array.

11. A system, comprising:
    a communication transceiver; and
    a co-processor coupled to said main processor unit, wherein said co-processor executes an instruction that causes a determination to be made as to whether an array index value points to a location preceding or following an array;
    wherein the instruction also causes a first status bit to be set if the array index value points to a location preceding or following the array and a second status bit to be set if the array index value equals the size of the array.

12. The system of claim 11 wherein the instruction causes a comparison to be performed between contents of a first register and contents of a second register and between the contents of the first register and a predetermined value, wherein the contents of the first register comprises an index value associated with the array and the contents of the second register comprises a value indicative of the size of the array.

13. The system of claim 12 wherein the predetermined value is 0.

14. The system of claim 12 wherein the instruction determines whether the contents of the first register is less than the predetermined value.

15. The system of claim 12 wherein the instruction determines whether the contents of the first register is greater than or equal to the contents of the second register.

16. The system of claim 12 wherein the instruction causes an overflow status bit to be set if an overflow would occur upon subtracting the contents of the second register from the contents of the first register.

17. The system of claim 12 wherein the instruction causes additional comparisons to be performed.

18. The system of claim 12 wherein the system comprises a cellular telephone.

19. A method of executing a single instruction, comprising:
   examining the instruction to determine a first register and a second register, the first register containing an array index value and the second register containing an array size value;
   comparing the array index value to the array size value;
   comparing the array index value to a predetermine value; and
   setting a common status bit if a condition is true selected from a group consisting of the array index value being greater than or equal to the array size value and the array index value being less than a predetermined value.

20. The method of claim 19 wherein the predetermined value is 0.

* * * * *

UNITED STATES PATENT AND TRADEMARK OFFICE
CERTIFICATE OF CORRECTION

PATENT NO. : 8,185,666 B2 Page 1 of 1
APPLICATION NO. : 11/116522
DATED : May 22, 2012
INVENTOR(S) : Gerard Chauvel It is certified that error appears in the above-identified patent and that said Letters Patent is hereby corrected as shown below:

On the title page, add item:

[30] Foreign Application Priority Data

July 27, 2004 (EP) .................................. 04291918.3

Signed and Sealed this
Eighteenth Day of December, 2012

David J. Kappos
*Director of the United States Patent and Trademark Office*